(12) United States Patent
Chen et al.

(10) Patent No.: US 11,797,961 B2
(45) Date of Patent: Oct. 24, 2023

(54) VECTORIZATION OF TRANSACTIONS

(71) Applicant: INTUIT INC., Mountain View, CA (US)

(72) Inventors: Meng Chen, Sunnyvale, CA (US); Wei Wang, San Jose, CA (US); Lei Pei, Sunnyvale, CA (US); Juan Liu, Cupertino, CA (US)

(73) Assignee: INTUIT, INC., Mountain View, CA (US)

( * ) Notice: Subject to any disclaimer, the term of this patent is extended or adjusted under 35 U.S.C. 154(b) by 72 days.

(21) Appl. No.: 16/932,074

(22) Filed: Jul. 17, 2020

(65) Prior Publication Data

US 2022/0019986 A1 Jan. 20, 2022

(51) Int. Cl.
*G06Q 20/12* (2012.01)
*G06N 5/04* (2023.01)
(Continued)

(52) U.S. Cl.
CPC ......... *G06Q 20/12* (2013.01); *G06F 16/9535* (2019.01); *G06N 5/04* (2013.01); *G06N 20/00* (2019.01)

(58) Field of Classification Search
CPC .... G06Q 20/12; G06Q 20/401; G06Q 20/405; G06F 16/9535; G06N 5/04; G06N 20/00
See application file for complete search history.

(56) References Cited

U.S. PATENT DOCUMENTS 9,037,464 B1 * 5/2015 Mikolov ................ G06F 40/30
704/255
10,572,607 B1 * 2/2020 Lesner .................... G06F 40/58
(Continued)

FOREIGN PATENT DOCUMENTS

WO WO-2022008131 A1 * 1/2022 ............. G06N 20/20

OTHER PUBLICATIONS

Mordecki, Gabriel, "Word embeddings: how to transform text into numbers," MonkeyLearn Blog, Dec. 17, 2017 (https://monkeylearn.com/blog/word-embeddings-transform-text-numbers/ (Year: 2017).*

(Continued)

*Primary Examiner* — Scott C Anderson
*Assistant Examiner* — James H Miller
(74) *Attorney, Agent, or Firm* — Patterson + Sheridan, LLP (57) ABSTRACT

Certain aspects of the present disclosure provide techniques for vectorization of transactions including: receiving electronic transaction information of one or more transactions of a user; for each transaction of the one or more transactions: segmenting the electronic transaction information of the transaction into one or more transaction words; generating a second transaction description related to the transaction; and identifying a category of the transaction; generating, based on the corresponding identified categories of the one or more transactions, a set of transaction history data of the user; providing the set of transaction history data of the user as an input to a machine learned model trained to output a set of word embedding vectors; determining, based on an output of the machine learned model comprising a set of word embedding vectors, a set of similar merchants; and providing the set of similar merchants for display to the user.

21 Claims, 5 Drawing Sheets

(51) Int. Cl.
   *G06N 20/00* (2019.01)
   *G06F 16/9535* (2019.01)

(56) References Cited

U.S. PATENT DOCUMENTS

| | | | | |
|---|---|---|---|---|
| 10,657,525 | B2* | 5/2020 | Duboue | G06N 3/088 |
| 10,949,825 | B1* | 3/2021 | Brosamer | G06Q 20/202 |
| 11,151,468 | B1* | 10/2021 | Chen | G06N 7/01 |
| 2005/0027664 | A1* | 2/2005 | Johnson | G06F 40/45 |
| | | | | 706/12 |
| 2012/0179453 | A1* | 7/2012 | Ghani | G06F 16/355 |
| | | | | 704/9 |
| 2012/0290376 | A1* | 11/2012 | Dryer | G06Q 20/385 |
| | | | | 705/14.23 |
| 2013/0246176 | A1* | 9/2013 | Chang | G06Q 30/0204 |
| | | | | 705/26.7 |
| 2015/0169745 | A1* | 6/2015 | Morimoto | G06Q 50/18 |
| | | | | 707/730 |
| 2015/0178383 | A1* | 6/2015 | Corrado | G06F 16/35 |
| | | | | 707/740 |
| 2018/0121555 | A1* | 5/2018 | Li | G06Q 50/01 |
| 2018/0157644 | A1* | 6/2018 | Mandt | G06N 3/045 |
| 2018/0204265 | A1* | 7/2018 | Malviya | G06F 40/55 |
| 2018/0300608 | A1* | 10/2018 | Sevrens | G06N 3/084 |
| 2018/0336369 | A1* | 11/2018 | Margalit | G06N 20/00 |
| 2019/0325029 | A1* | 10/2019 | Gandhi | G06F 40/284 |
| 2019/0385080 | A1* | 12/2019 | Wu | G06N 3/044 |
| 2020/0065785 | A1* | 2/2020 | Hart | G06Q 20/085 |
| 2020/0118137 | A1* | 4/2020 | Sood | G06Q 10/00 |
| 2020/0134627 | A1* | 4/2020 | Hamooni | G06Q 20/4016 |
| 2020/0250185 | A1* | 8/2020 | Anderson | G06Q 30/01 |
| 2020/0380021 | A1* | 12/2020 | Barbour | G06F 16/313 |
| 2021/0065260 | A1* | 3/2021 | Zheng | G06Q 30/0282 |

OTHER PUBLICATIONS

NPL—Good Code Archive "word2vec" (Year: 2019).*
Exploiting Similarities among Languages for Machine Translation (Year: 2013).*
Efficient Estimation of Word Representations in Vector Space (Year: 2013).*
Mining of Massive Datasets (Year: 2019).*
Terry-Jack, Mohammed, "NLP: Everything about Embeddings" (Year: 2019).*

* cited by examiner

VECTORIZATION OF TRANSACTIONS

INTRODUCTION

Aspects of the present disclosure relate to computationally efficient systems and methods for vectorization of transactions.

Electronic transactions have grown significantly in volume over the last several years. Existing systems that record the electronic transactions generally record them using various syntax and formats that may be proprietary to those systems. Therefore, different systems may record a similar transaction in different formats and using different syntax. Such various syntax and formats make it particularly challenging for existing systems to accurately extrapolate information from the recorded transactions and to understand the context of the transactions.

Without accurately understanding the context of such transactions, the existing systems are unable to provide any meaningful services that may enrich a customer's life, such as recommending merchants where the customer is more likely to shop, providing discounts to merchants where a customer is more likely to shop, and other similar services. Furthermore, these various syntax and formats make it computationally expensive for existing systems to aggregate and process the different transactions for each customer over a period of time.

Accordingly, what is needed are improved systems and techniques that efficiently understand context of transactions and provide useful services for a customer.

BRIEF SUMMARY

Certain embodiments provide a method for transaction vectorization. The method generally includes receiving electronic transaction information of one or more transactions of a user. The method further includes, for each transaction of the one or more transactions, segmenting, based on a segmenting criteria, the electronic transaction information of the transaction into one or more transaction words. The method further includes, for each transaction of the one or more transactions, generating, based on the one or more transaction words, a second transaction description related to the transaction. The method further includes, for each transaction of the one or more transactions, identifying, based on the second transaction description, a category of the transaction. The method also includes, generating, based on the corresponding identified categories of the one or more transactions, a set of transaction history data of the user. The method further includes providing the set of transaction history data of the user as an input to a machine learned model trained to output a set of word embedding vectors based on the set of transaction history data. The method further includes determining, based on an output of the machine learned model comprising a set of word embedding vectors, a set of similar merchants. The method further includes providing the set of similar merchants for display to the user.

Certain embodiments provide a processing system, comprising: a memory comprising computer-executable instructions; a processor configured to execute the computer-executable instructions and cause the processing system to: receive electronic transaction information of one or more transactions of a user; for each transaction of the one or more transactions: segment, based on a segmenting criteria, the electronic transaction information of the transaction into one or more transaction words, generate, based on the one or more transaction words, a second transaction description related to the transaction, and, identify, based on the second transaction description, a category of the transaction; generate, based on the corresponding identified categories of the one or more transactions, a set of transaction history data of the user; provide the set of transaction history data of the user as an input to a machine learned model trained to output a set of word embedding vectors based on the set of transaction history data; determine, based on an output of the machine learned model comprising a set of word embedding vectors, a set of similar merchants; and provide the set of similar merchants for display to the user.

Certain embodiments provide a non-transitory computer-readable medium comprising computer-executable instructions, which, when executed by a processing system, cause the processing system to perform a method for receiving electronic transaction information of one or more transactions of a user; for each transaction of the one or more transactions: segmenting, based on a segmenting criteria, the electronic transaction information of the transaction into one or more transaction words, generating, based on the one or more transaction words, a second transaction description related to the transaction, and identifying, based on the second transaction description, a category of the transaction; generating, based on the corresponding identified categories of the one or more transactions, a set of transaction history data of the user; providing the set of transaction history data of the user as an input to a machine learned model trained to output a set of word embedding vectors based on the set of transaction history data; determining, based on an output of the machine learned model comprising a set of word embedding vectors, a set of similar merchants; and providing the set of similar merchants for display to the user.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for vectorization of transactions.

The number of electronic transactions have grown significantly over the last few years. The growth in the number of electronic transactions has led to storing of information related to electronic transactions by personal finance applications. Therefore, personal finance application may store information related to thousands of transactions for each user of the personal finance application, and may store information related to over 1 billion transactions in for all customers per month. Customers of such personal finance applications desire to receive additional services, such as merchant recommendations, coupons, discounts, and the like, from the vendors of these personal finance applications.

The transaction information stored by the personal finance applications may not be in a natural language format or with any contextual information. To provide the additional services to the customers, the vendors will have to process such transaction information of a large number of transactions (e.g., 1 billion transactions) to extrapolate relationships between the transactions. Processing such information to extrapolate relationships between the transactions may include comparing the information of one transaction with information of another transaction, categorizing the transactions, identifying relationships between the transactions, and the like. However, such processing of transaction information for a large number of transactions can be computationally expensive.

Accordingly, there is a need for systems and techniques that can process the transaction information in a manner that reduces the cost of computations in processing the transaction information.

The systems and techniques described herein are configured to preprocess the transaction information of the transactions, provide the preprocessed information to a machine learning model trained to vectorize words of the preprocessed transaction information, and determine similarities between transactions.

As described above, more than 1 billion transactions may be processed every month by personal finance applications. Therefore, improvements in computation costs provided by the systems and techniques can quickly add up to significant improvements in computation costs of processing all of information of a large number of transactions.

The systems and techniques described herein may improve Additional details of the systems and techniques are described herein below and with respect to FIGS. 1-4.

Electronic Transaction Information

Electronic transaction information or information related to transactions, as described herein, may include any information and/or descriptions related to the transaction. Electronic transaction information of a transaction may be information generated and/or recorded by a transaction processing entity, a financial institution (e.g., a bank), a personal finance entity, and the like, of the transaction. For example, for a transaction with a Merchant-A, an example electronic transaction information may be "ONLINE TRANSFER TO MERCHANT-A #IB04C3BXBQ 09:50 AM $12.3 95117 123-456-7890 SAN JOSECA."

In the above example, the electronic transaction information includes information related to the type of the transaction, the merchant's name, an identifier of the transaction, a timestamp at which the transaction occurred, amount of the transaction, telephone number of the merchant, zip code, city, and state of where an office of the merchant may be located. However, such information is not presented in a natural language format or with any contextual information such that a computing system in a real-world application may recognize and determine, in a computationally efficient manner, any similarities between this transaction and other transactions of the user or other users in order to provide any additional information and/or services to the user.

Preprocessing of Electronic Transaction Information

While the electronic transaction information of a transaction may not be present in a manner from which a computing system may extrapolate information, the electronic transaction information may be preprocessed to present information related to the transaction in a more computationally efficient structure.

The systems and techniques described herein may preprocess the electronic transaction information by using a search criteria to search for certain sequences of characters and/or words to segment some predetermined information from the electronic transaction information. Examples of such predetermined information may include, but are not limited to, transaction type, merchant name, merchant contact information (e.g., phone numbers, emails, and the like), and merchant address, to name a few. The systems and techniques described herein may generate a second transaction description for each transaction based on the corresponding segmented transaction information. Based on the second transaction descriptions and the categories associated with the second transaction descriptions, the systems and techniques described herein may generate a set of transaction history data for the user. The set of transaction history data may be provided to a machine learning model trained to output a word embedding vectors for each word in the transaction.

Brief Overview of Machine Learning

The systems and methods described herein utilize machine learning to vectorize transactions.

Machine learning is generally an application of artificial intelligence (AI) that enables processing systems to automatically learn and improve from exposure to data without being explicitly programmed. The process of "learning" relies on processing data (e.g., "observations") with machine learning algorithms to find, for example, patterns that may be otherwise undiscernible by normal inspection. Machine learning algorithms thus allow processing systems to learn without human intervention or assistance. Machine learning algorithms are often categorized as supervised or unsupervised.

Supervised machine learning algorithms generally analyze training data with known target or output values (e.g., labels) in order to determine a function that may be subsequently used to make predictions (or "inferences") based on new, unlabeled data. To learn, such algorithms may compare the predicted output of the predictive function with the known output of training data to evolve the predictive function in such a way that prediction error is eventually minimized.

Unsupervised machine learning algorithms generally analyze training data without labels. Thus, unsupervised learning generally determines a function to describe latent structure in unlabeled training data. For example, unsupervised machine learning algorithms may generate clusters of data, decision boundaries between subsets of data, and the like.

Semi-supervised machine learning algorithms generally use both labeled and unlabeled data for training, which may typically involve a relatively smaller amount of labeled data and a relatively larger amount of unlabeled data. The labeled data generally improves learning accuracy as compared to unsupervised technique.

Reinforcement machine learning algorithms generally involves interacting with a specific environment through "actions" and discovering errors or rewards through those interactions. Reinforcement algorithms thus allow processing systems to automatically determine an ideal behavior within a specific context in order to maximize its performance. Feedback, which may be considered a reinforcement signal, is generally required for the reinforcement algorithms to learn which action is best.

Machine learning thus enables analysis of large quantities of data to generate models for myriad purposes. The embodiments described herein generally refer to supervised learning techniques, but other machine learning techniques may be possible in other embodiments.

Processing the Preprocessed Electronic Transaction Information Using Machine Learning The set of transaction history data may be provided to a machine learning model (e.g., word2vec, and the like) trained to output a word embedding vector for each word of the set of transaction history data. The word embedding vectors from the machine learning model provide contextual information of or more words in the transaction history data. The machine learning model may be trained to output word embedding vectors with more dominant and/or extreme values for certain key words in the set of transaction history data. For example, the machine learning model may be trained to output a word embedding vector for a word that is a merchant name with values that are more dominant or extreme than a word that indicates a transaction type.

The systems and techniques described herein may generate transaction vectors based on the word embedding vectors and determine similar merchants based on the transaction vectors.

Additional details of transaction vectorization and computing similarities between transactions and/or users are described herein with reference to FIGS. 1-4.

Example Transaction Vectorization System

Figure 1:
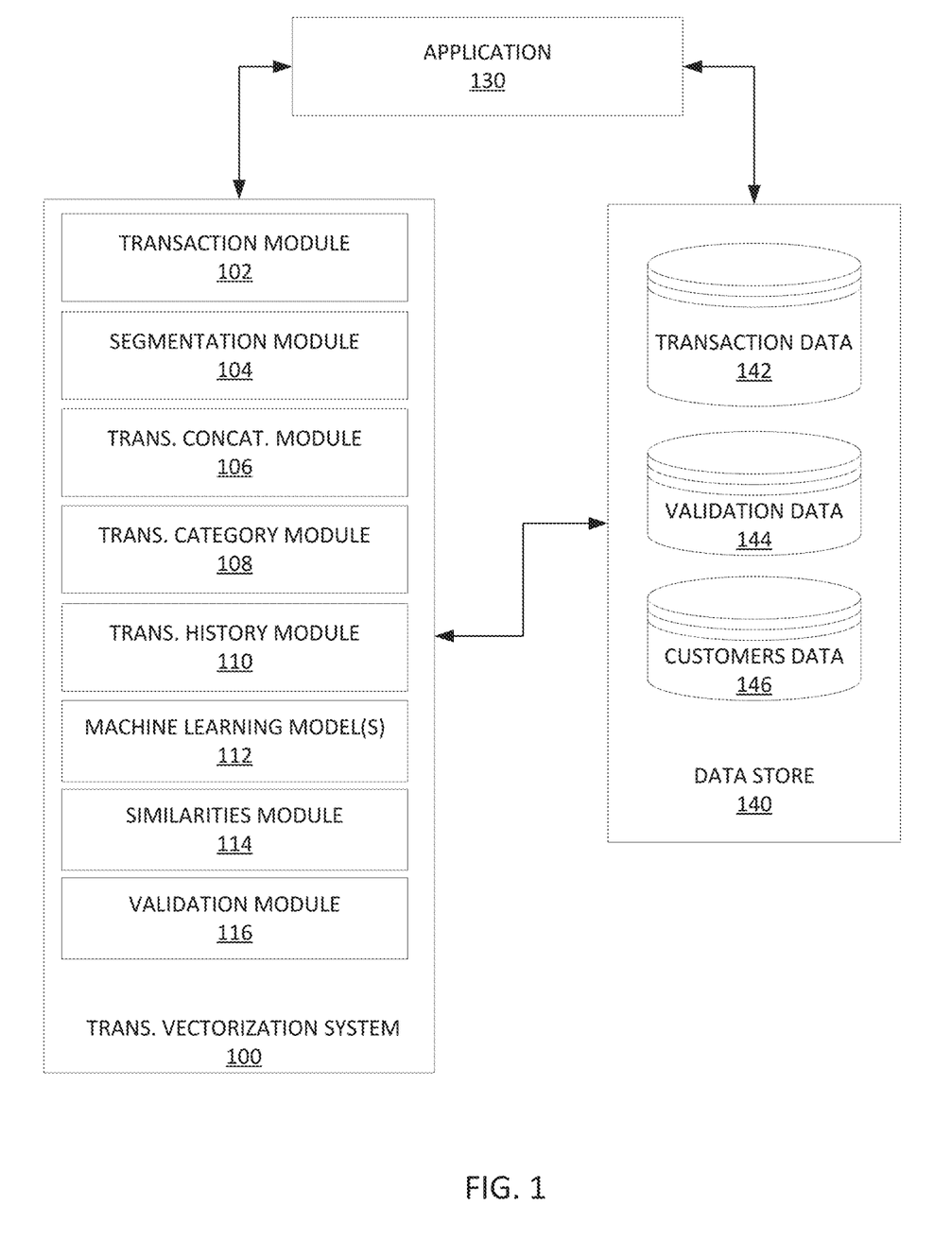
FIG. 1 depicts an example system for transaction vectorization, in accordance with certain embodiments of the present disclosure.

FIG. 1 depicts an example transaction vectorization system 100 for computing similarities between transactions and/or users. As shown in FIG. 1, the transaction vectorization system 100 may be communicatively coupled to an application 130, and a data store 140. The transaction vectorization system 100 includes transaction module 102, segmentation module 104, transaction concatenation module 106, transaction category module 108, transaction history module 110, one or more machine learning model(s) 112, similarities module 114, validation module 116.

The transaction module 102 may receive electronic transaction information of one or more transactions of a user. As described above, the electronic transaction information may include a description of the transaction. The description of the transaction may indicate whether the transaction occurred online (e.g., via an electronic commerce website), or offline (e.g., via a brick and mortar store), a type of the transaction (e.g., receiving, sending, transfer, and the like), a transaction identifier, a time of the transaction, an amount of the transaction, a merchant identifier (e.g., name of a merchant), address information of the merchant (e.g., zip code, city, state, and the like), contact information of the merchant (e.g., electronic mail (e-mail) address, telephone number, and the like), other information related to the merchant, and/or the like.

The transaction module 102 may receive electronic transaction information of the one or more transactions of a user in response to a request for the one or more transactions of the user transmitted to the data store 140. In some implementations, the request for the one or more transactions of the user may be transmitted by the transaction module 102. In some implementations, the transaction module 102 may transmit the request for the one or more transactions based on whether the user satisfies a threshold criteria. For example, the threshold criteria may specify that a user must re-categorize at least one transaction from a one spending category (e.g., food category) to another spending (e.g., clothing category), in a certain period of time (e.g., three months) to vectorize the transactions of the user, and the transaction module 102 may transmit the request for one or more transactions of the user if the user satisfies the threshold criteria.

The segmentation module 104 may segment the electronic information of the one or more transactions of a user into one or more transaction words. The segmentation module 104 may segment the electronic information based on a segmenting criteria. In some implementations, the segmentation criteria may indicate one or more characters, delimiters, sequence of characters, and/or the like, that define a search pattern. In some implementations, the segmentation criteria may be a regular expression that indicates the search pattern. The segmentation criteria may define a search pattern that searches for a type of the transaction, a transaction identifier, a merchant identifier, zip code of the merchant, phone number of the merchant, city of the merchant where the transaction occurred, state of the merchant where the transaction occurred. In some implementations, the one or more segmented transaction words may be stored in association with the transaction identifier of the transaction in a data storage unit communicatively coupled to the transaction vectorization system 100.

The transaction concatenation module 106 may generate a second transaction description of a transaction based on the one or more segmented transaction words of the transaction. The transaction concatenation module 106 may generate the second transaction description by concatenating the one or more segmented transaction words of the transaction. In some implementations, the transaction concatenation module 106 may concatenate the one or more segmented transaction words based on a delimiter character, such as a space, comma, semicolon, and the like. The transaction concatenation module 106 may associate the generated second transaction descriptions with the corresponding transaction identifiers and may store the associations in a data storage unit communicatively coupled to the transaction vectorization system 100. The transaction concatenation module 106 may associate the generated second transaction descriptions with categories of the corresponding transactions and may store the associations in a data storage unit communicatively coupled to the transaction vectorization system 100.

The transaction category module 108 may identify one or more unique categories associated with the one or more transactions of the user. For example, if a user has 100 transactions, where 75 transactions are associated with the category food, 20 transactions are associated with the category clothing, and 5 transactions are associated with the category automotive, then the transaction category module 108 may identify three unique categories of food, clothing, and automotive. The transaction category module 108 may identify the one or more unique categories based on the second transaction descriptions. For example, based on the associations between second transaction descriptions and the categories by the transaction concatenation module 106, the transaction category module 108 may identify the associated unique categories.

The transaction history module 110 may generate a set of transaction history data for the user. The transaction history module 110 may generate the set of transaction history data for the user based on the identified unique categories of the one or more transactions of the user. The set of transaction history data may include one or more transaction sentence strings. The transaction history module 110 may generate one or more transaction sentence strings based on second transaction descriptions associated with the unique identified categories. The transaction history module 110 may generate a transaction string for each unique category identified by the transaction category module 108.

The transaction history module 110 may generate a transaction sentence string for each unique category by concatenating the second transaction descriptions associated with that unique category. In some implementations, the transaction history module 110 may generate a transaction sentence string by concatenating two or more second transaction descriptions using a delimiter such as, a comma, a semicolon, a space, and/or the like.

In some implementations, the one or more received transactions of the user may be ordered (e.g., ordered chronologically). In some implementations, the transaction history module 110 may order the set of transactions based on a predetermined chronological order (e.g., oldest transaction first). In some implementations, the transaction history module 110 may identify one or more repeating transactions and eliminate the repeating transactions from the set of transaction history data in a manner that preserves the neighbor information of the remaining transactions.

For example, if the transactions of the user include transactions for a merchant "A" and a merchant "B", and transactions are in the sequence of "AAABBA," where the first three transactions of this sequence of transactions are for merchant A, and the fourth and fifth transactions are for merchant B, and the sixth transaction is for merchant A, then the transaction history module 110 may eliminate one or more of the repeating transactions from the set of transaction history data in a manner such that the remaining transactions are "ABA," where the first transaction of this sequence of transaction is for merchant A, then followed by the transaction for merchant B, and then followed by the transaction of merchant A. By eliminating the repeating transactions in this manner the transaction history module 110 preserves the neighboring information between the transaction for merchant "A" followed by the transaction for merchant "B," and the neighboring information between the transaction for merchant "B" followed by the transaction for merchant "A."

The one or more machine learning model(s) 112 may include a word2vec model and/or various other machine learning models, such as other neural network models, and the like. Machine learning model(s) 112 may be trained based on data stored in data store 140. For example, machine learning model(s) 112 may be trained based on the transaction data of the various users stored in transaction data 142 of data store 140. The machine learning model(s) 112 may receive as input(s) a set of transaction history data generated by the transaction history module 110. The machine learning model(s) 112 may be trained to output a set of word embedding vectors based on the set of transaction history data.

The machine learning model(s) 112 may be trained to output a word embedding vector for each unique word in the set of transaction history data provided as an input to the machine learning model(s) 112. For example, if the set of transaction history data provided as an input to the machine learning model(s) 112 is "Merchant-A US CA SF Merchant-B US Merchant-C giftcard US 877-xxx-xxxx," then the machine learning model(s) 112 may output a word embedding vector for each of "Merchant-A", "US", "CA", "SF", "Merchant-B", "Merchant-C", "giftcard", and 877-xxx-xxxx. In some implementations, the dimension size of each word embedding vector may be between 200 and 250 dimensions.

The similarities module 114 may generate one or more transaction vectors based on the set of word embedding vectors output by the machine learning model(s) 112. The similarities module 114 may transform the one or more word embedding vectors based on a transformation criteria. In some implementations, the transformation criteria may be specified as calculating a statistical measurement on the set of word embedding vectors of the output of the machine learning model(s) 112. For example, the transformation criteria may be specified as calculating a mean on the set of word embedding vectors. Similarly, the transformation criteria may be specified as calculating an absolute maximum, and/or other statistical measurements.

The similarities module 114 may apply the transformation criteria across the dimensions of each word embedding vector to generate the one or more transaction vectors. For example, if the transformation criteria specifies calculating a mean, then the similarities module 114 may calculate a mean across each dimension of the word embedding vectors to generate the one or more transaction vectors. Similarly, if the transformation criteria specifies calculating an absolute maximums, then the similarities module 114 may calculate an absolute maximum across each dimension of the word embedding vectors to generate the one or more transaction vectors. The word embedding vectors with dimensions with the most relatively highest and/or dominating values may be the vectors that are the most relative for the transactions of the user. By applying the transformation criteria as described herein to the embedding vectors, the generated transaction vectors corresponding to such word embedding vectors may represent the transactions of the user.

One or more of the generated transaction vectors may represent the transactions of the user. One or more of the generated transaction vectors may represent merchants of the transactions of the user. The one or more generated transaction vectors may be associated with the user. For example, one or more generated transaction vectors may be associated with a unique user identifier. In some implementations, the associations between the one or more generated transaction vectors may be stored in a data storage unit communicatively coupled to the transaction vectorization system 100.

The similarities module 114 may determine a set of similar merchants based on the generated set of transaction vectors. The similarities module 114 may calculate a distance between a generated transaction vector representing a merchant and a merchant vector, and determine whether the merchant vector is similar to the generated transaction vector when the distance satisfies a threshold distance. For example, the similarities module 114 may calculate a cosine similarity of the generated transaction vector and the merchant vector to determine whether the distance between the generated transaction vector satisfies the threshold distance level. In some implementations, the similarities module 114 may determine one or more similar merchants for each of the generated transaction vectors. In some implementations, the similarities module 114 may select a predetermined number of similar merchants ((e.g., ten merchants) for each transaction vector and present them as a set of similar merchants to the user. For example, the similarities module 114 may cause the set of similar merchants to be displayed on a display device with which a user interacts.

In some implementations, the similarities module 114 may generate a user vector based on the transaction vectors. For example, the similarities module 114 may generate a user vector by calculating an average of all the generated transaction vectors. The similarities module 114 may determine one or more similar users based on the generated user vector. For example, the similarities module 114 may calculate cosine similarity between the user vector and other user vectors to identify other users similar to the user. For each similar user, the similarities module 114 may identify a set of merchants that the corresponding similar user frequently transacts with, and provides that set of similar merchants to the user.

The validation module 116 may verify accuracy of the similar merchants determined by the similarities module 114. The validation module 116 may receive ground truth merchant pairs from the validation data 144 and, for each merchant of the pairs, the validation module 116 may determine whether a merchant provided by the similarities module 114 matches the corresponding merchant of the merchant pair. The ground truth merchant pairs may be predetermined and stored in the validation data 144. The merchants of the ground truth merchant pairs may be merchants of the same category. For example, a ground truth merchant pair may be a pair of merchants that are part of the clothing category. Similarly, another ground truth merchant pair may be a pair of merchants that are in the home improvement category. The validation module 116 may display the set of similar merchants provided by the similarities module 114 to a user, as shown in plot 300 of FIG. 3.

A merchant may have ground truth pairs with one or more merchants. For example, if Merchant-A, Merchant-B, and Merchant-C are predetermined to be similar to each other, then ground truth merchant pairs for Merchant-A may be a first pair of Merchant-A and Merchant-B, and a second pair of Merchant-A and Merchant-C. Continuing with this example, the validation module 116 may query the similarities module 114 for Merchant-A, and verify whether Merchant-B and/or Merchant-C are included in the set of similar merchants provided to the validation module 116.

The similarities module 114 may provide a distance value between two vectors representing two merchants. The provided distance value may indicate a learned similarity between the two merchants. The validation module 116 may determine and/or verify the accuracy of the set of similar merchants provided by the similarities module 114, and the learned similarities by the machine learning model(s) 112, based on whether the provided distance value satisfies a threshold similarity distance value for the two merchants (e.g., less than or equal to the threshold similarity distance value). The threshold similarity distance value between different merchant pairs may be predetermined and may be different for different merchant pairs. In some implementations, the threshold similarity distance between two vectors representing two merchants may be based on how similar the two merchants are determined to be. For example, if Merchant-A and Merchant-B provide very similar home improvement products, then the merchants may be predetermined to be very similar, and the threshold similarity distance value between the two merchants may be minimal.

Some of the ground truth merchant pairs for a merchant may be with merchants that are not very similar to or very dissimilar from that merchant, and/or with merchants that are associated with different categories from that merchant. For example, a merchant that sells baked goods is dissimilar from a merchant that sells home furniture. The threshold similarity distance value for merchants that are dissimilar from each other may be a significant value. For example, the threshold similarity distance value between a merchant pair of a merchant that sells baked goods and a merchant that sells home furniture may be larger than a threshold similarity distance value between merchant pair of similar merchants. The validation module 116 may determine and/or verify the accuracy of the set of similar merchants provided by the similarities module 114, and the learned similarities by the machine learning model(s) 112, based on whether a dissimilar merchant is provided in the set of similar merchants from the similarities module 114. The validation module 116 may further determine the accuracy based on whether a provided distance between two vectors representing two merchants of ground truth merchant pairs of dissimilar merchants satisfy value (e.g., greater than or equal to the threshold similarity distance value) the corresponding threshold similarity distance.

In some implementations, the validation module 116 may generate ground truth merchant pairs of two similar merchants if the merchants are associated with the same category and a threshold number of users (e.g., 3,000 users) transact at both the merchants. For example, the validation module 116 may generate a ground truth merchant pair of similar merchants of a Merchant-D and a Merchant-E if the validation module 116 determines that Merchant-D and Merchant-E are associated with the same category by users and at least 3,000 users transact at Merchant-D and Merchant-E. In some implementations, the validation module 116 may generate a ground truth merchant pair of two dissimilar merchants if the number of users that transact at both merchants are below a threshold number of users (e.g., 70 users). For example the validation module 116 may generate a ground truth merchant pair of Merchant-D and Merchant-F if the validation module 116 determines that fewer than 70 users transact at both Merchant-D and Merchant-F.

The data store 140 may store transaction data 142, validation data 144, users data 146, and the like. The transaction data 142 may include transaction related information of multiple transactions of multiple users. The transaction related information of multiple transactions of multiple users may be stored in association with a unique identifier of the corresponding users. The transaction related information may be categories assigned and/or selected for the corresponding transaction. In some implementations, the category for the transaction may be assigned by an external application, such as application 130. In some implementations, the category for the transaction may be selected by a user (e.g., via an interaction with the application 130).

The validation data 144 may include a golden data set of ground truth common merchant pairs. The common merchant pairs may be a pair of merchants that are predetermined as being similar to each other. For example, two clothing merchants at which a set of large number of users shop, two home improvement merchants at which a set of large numbers of users shop, and the like. Customers data 146 may biographical, geographical, and other similar data of users. The customers data 146 may include data related to merchants with whom a user most frequently transacts. In some implementations, for each similar user determined by the similarities module 114, the similarities module 114 may identify a set of merchants which whom the similar user transacts based on the customers data 146 of the similar user.

The application 130 may be any sort of application, such as a desktop application, web-based application, mobile device application, and the like. In some examples, application 130 may be a personal finance application. The application 130 may be configured with one or more user interfaces (UIs) to register objectives and request execution of the objectives.

Note that while FIG. 1 does not depict any specific network or networks, one or more networks, such as local area networks (LANs), wide area networks (WANs), and the like, may connect transaction vectorization system 100 with the data store 140 and the application 130, and likewise the data store 140 with the application 130.

Example Process Flow for Transaction Vectorization

Figure 2:
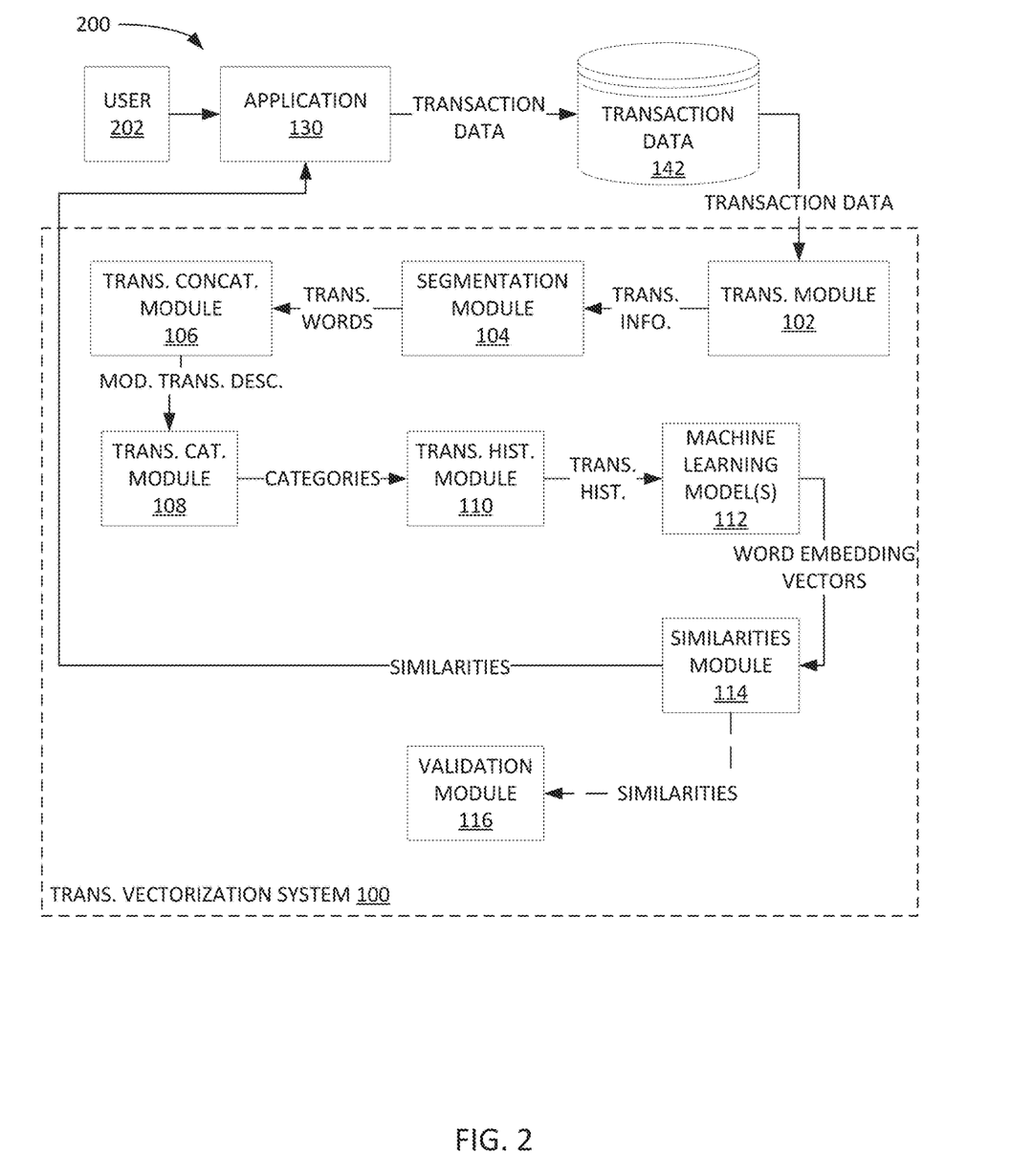
FIG. 2 depicts an example process flow for transaction vectorization, in accordance with certain embodiments of the present disclosure.

FIG. 2 depicts an example process flow 200 for vectorizing transactions with transaction vectorization system 100.

Process flow 200 starts at 202 where a user interacts with an application 130 to provide the application with transaction information related to one or more transactions. In some implementations, the user interact with the application 130 to explicitly grant permissions to the application 130 to automatically receive information related to the user's transactions from another application (e.g., a banking application, and/or the like).

The application 130 may transmit the received transaction data of the user to the data store 140. Along with the transaction data, the application 130 may transmit a unique identifier of the user, user transaction preferences, changes to any default and/or predetermined categories for the transactions, and the like. The data store 140 may store the transaction data along in the transaction data 142. The data store 140 may store the transaction data in association with the unique identifier of the user, user transaction preferences, categories of the transactions, and/or other similar information related to the transactions. As described above, the transaction data 142 may include transaction data for multiple other users.

The data store 140 may transmit transaction data to the transaction vectorization system 100. For example, the data store 140 may transmit the transaction data to the transaction module 102 of the transaction vectorization system 100. For each transaction of the transaction data, the transaction module 102 may provide the electronic information related to the transaction to the segmentation module 104.

The segmentation module 104 may segment the electronic information of each transaction into one or more transaction words. As described above, the segmentation module 104 may segment the electronic information into one or more segmentation words based on a segmenting criteria. The one or more transaction words may indicate a type of the transaction, a transaction identifier, a merchant identifier, zip code of the merchant, phone number of the merchant, city of the merchant where the transaction occurred, state of the merchant where the transaction occurred, and/or the like. The segmentation module 104 may provide the one or more transaction words to the transaction concatenation module 106. In some implementations, the segmentation module 104 may provide the one or more transaction words in association with a corresponding transaction identifier.

For each transaction, the transaction concatenation module 106 may concatenate one or more transaction words to generate a second transaction description for that transaction. The transaction concatenation module 106 may store the second transaction descriptions in association with a category associated with the transaction and/or the user. The transaction concatenation module 106 may provide the second transaction descriptions to the transaction category module 108.

The transactions category module 108 may identify categories associated with the second transaction descriptions. The transaction category module 108 may identify categories associated with second transaction descriptions based on the stored associations between the categories and the second transaction descriptions. The transaction category module 108 may provide the categories to the transaction history module 110.

The transaction history module 110 may generate sentence strings for each unique category of the received categories. Each sentence string may include one or more second transaction descriptions. As described above, the transaction history module 110 may generate sentence strings for each unique category by concatenating the second transaction descriptions associated with that category. The transaction history module 110 may generate a set of transaction history data based on the sentence strings of each unique category. The transaction history module 110 may provide the set of transaction history data to a machine learned model(s) 112.

As described above, the machine learned model(s) 112 may be trained to output a set of word embedding vectors based on the set of transaction history data. The machine learned model(s) 112 may output the word embedding vectors. Based on the word embedding vectors output from the machine learned model(s) 112, the similarities module 114 may generate transaction vectors.

As described above, the similarities module 114 may generate transaction vectors by applying a transformation criteria to the word embedding vectors output. Based on the transaction vectors, the similarities module 114 may search and/or determine a set of the similar merchant vectors. Based on the similar merchant vectors, the similarities module 114 may provide the set of the similar merchants (e.g., names of the similar merchants) for display to a user. For example, the similarities module 114 may provide the names of similar merchants to the application 130 for display to a user.

Figure 3:
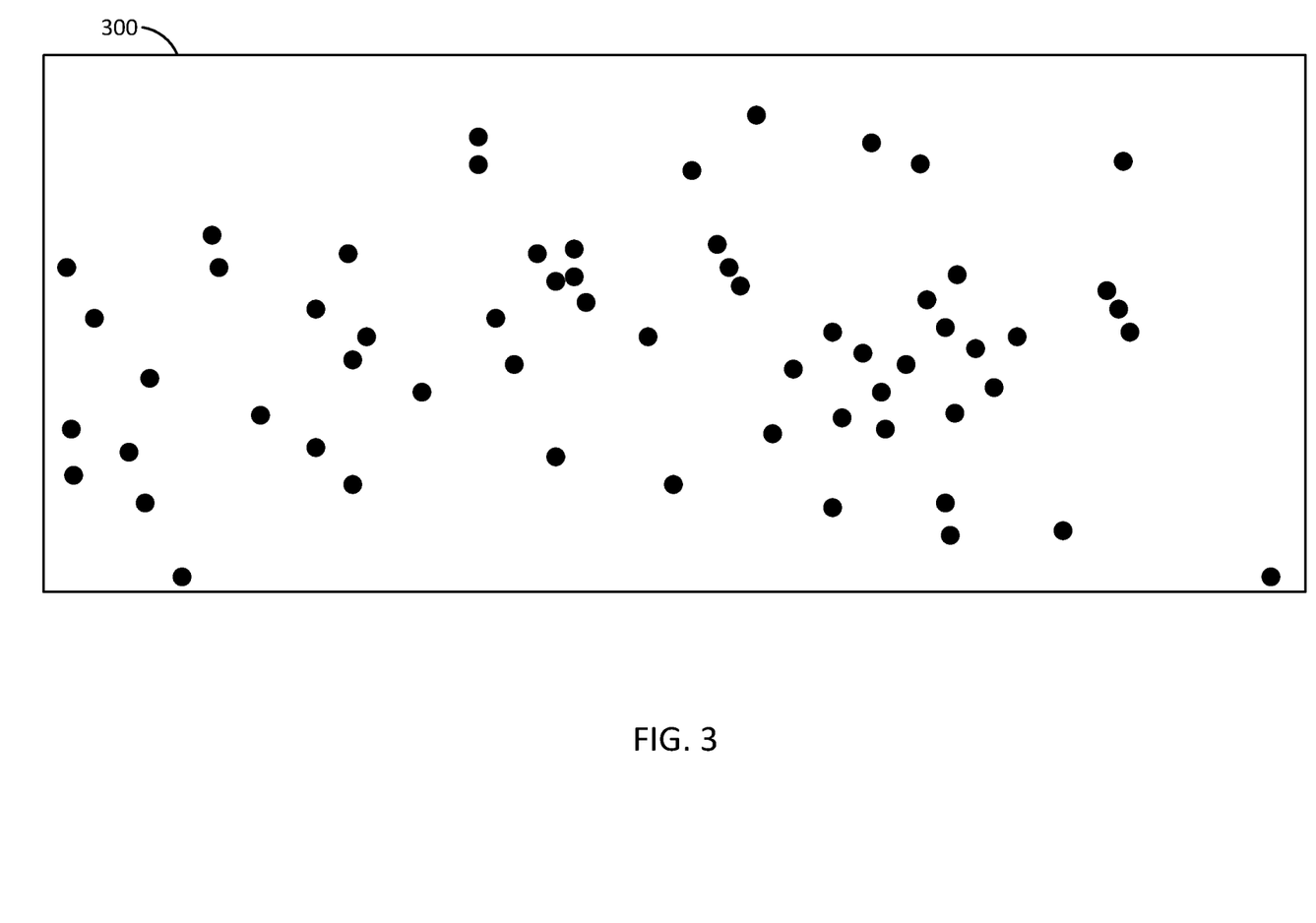
FIG. 3 depicts a graphical illustration of a number merchant vectors in a two-dimensional vector space, in accordance with certain embodiments of the present disclosure.

During a training phase of the machine learning model(s) 112, as described above, the validation module 116 may verify accuracy of the similar merchants determined by the similarities module 114 using ground truth merchant pairs and determine whether the set of similar merchants determined by the similarities module 114 include the other merchant of the ground truth merchant pairs. In some implementations, the validation module 116 may reduce dimensions of the various sets of similar merchant vectors for various ground truth merchant pairs received from the similarities module 114, and display that vector space on a two-dimensional plot, as shown in FIG. 3. In FIG. 3, the groups of merchant vectors that are clustered near each other are merchants that are similar to each other. Further, in FIG.

3, the merchant vectors that are distant from a merchant vector are merchants that are not similar to each other.

Example Method of Transaction Vectorization

Figure 4:
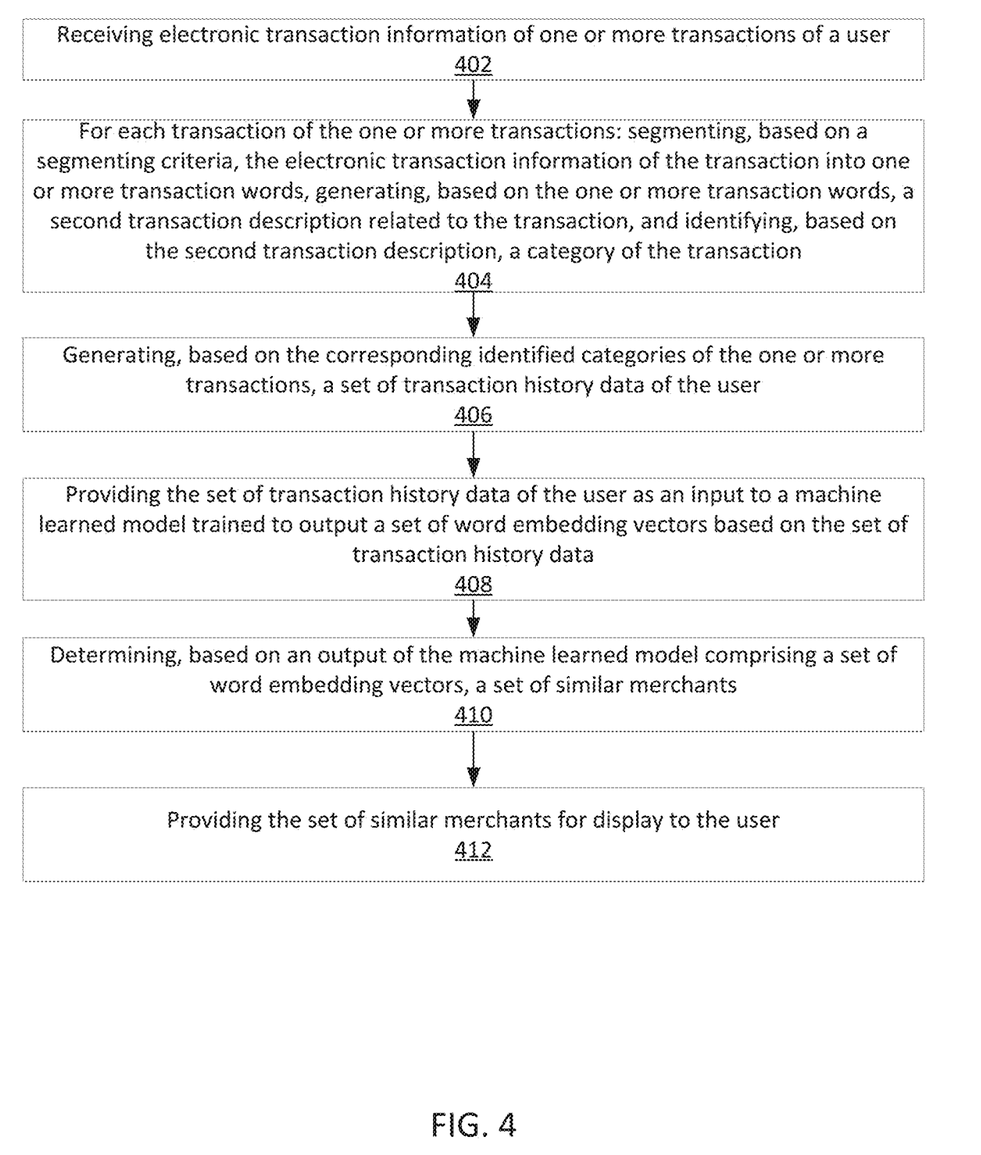
FIG. 4 depicts an example method of transaction vectorization, in accordance with certain embodiments of the present disclosure.

FIG. 4 depicts an example method 400 of transaction vectorization.

Method 400 begin at step 402 with receiving electronic transaction information of one or more transactions of a user.

Method 400 then proceeds to step 404 with, for each transaction of the one or more transactions: segmenting, based on a segmenting criteria, the electronic transaction information of the transaction into one or more transaction words, generating, based on the one or more transaction words, a second transaction description related to the transaction, and identifying, based on the second transaction description, a category of the transaction.

Method 400 then proceeds to step 406 with, generating, based on the corresponding identified categories of the one or more transactions, a set of transaction history data of the user.

Method 400 then proceeds to step 408 with providing the set of transaction history data of the user as an input to a machine learned model trained to output a set of word embedding vectors based on the set of transaction history data.

Method 400 then proceeds to step 410 with, determining, based on an output of the machine learned model comprising a set of word embedding vectors, a set of similar merchants.

Method 400 then proceeds to step 412 with, providing the set of similar merchants for display to the user.

In some implementations, method 400 further comprises for each transaction of the one or more transactions, generating, based on the identified category of the transaction and the second transaction description of the transaction, one or more transaction sentence strings. In some implementations, each transaction sentence string comprises at least two or more second transaction descriptions concatenated by a delimiter. In some implementations, the set of transaction history data of the user comprises the one or more transaction sentence strings. In some implementations, each word embedding vector of the set of word embedding vectors corresponds to a transaction word in the set of transaction history data of the user.

In some implementations, the method 400 further comprises, transforming, based on a transformation criteria, values of the set of word embedding vectors. In some implementations, the method 400 further comprises, generating, based on the transformed values of the set of word embedding vectors, a set of transaction vectors.

In some implementations, the method 400 further comprises, determining, based on the set of transaction vectors, the set of similar merchants. In some implementations, the transformation criteria indicates at least one of a mean or maximum absolute value. In some implementations, the method 400 further comprises, identifying, based on the set of transaction vectors, a set of similar users. In some implementations, the method 400 further comprises, determining, based on the set of similar users, the set of similar merchants.

Example Processing System

Figure 5:
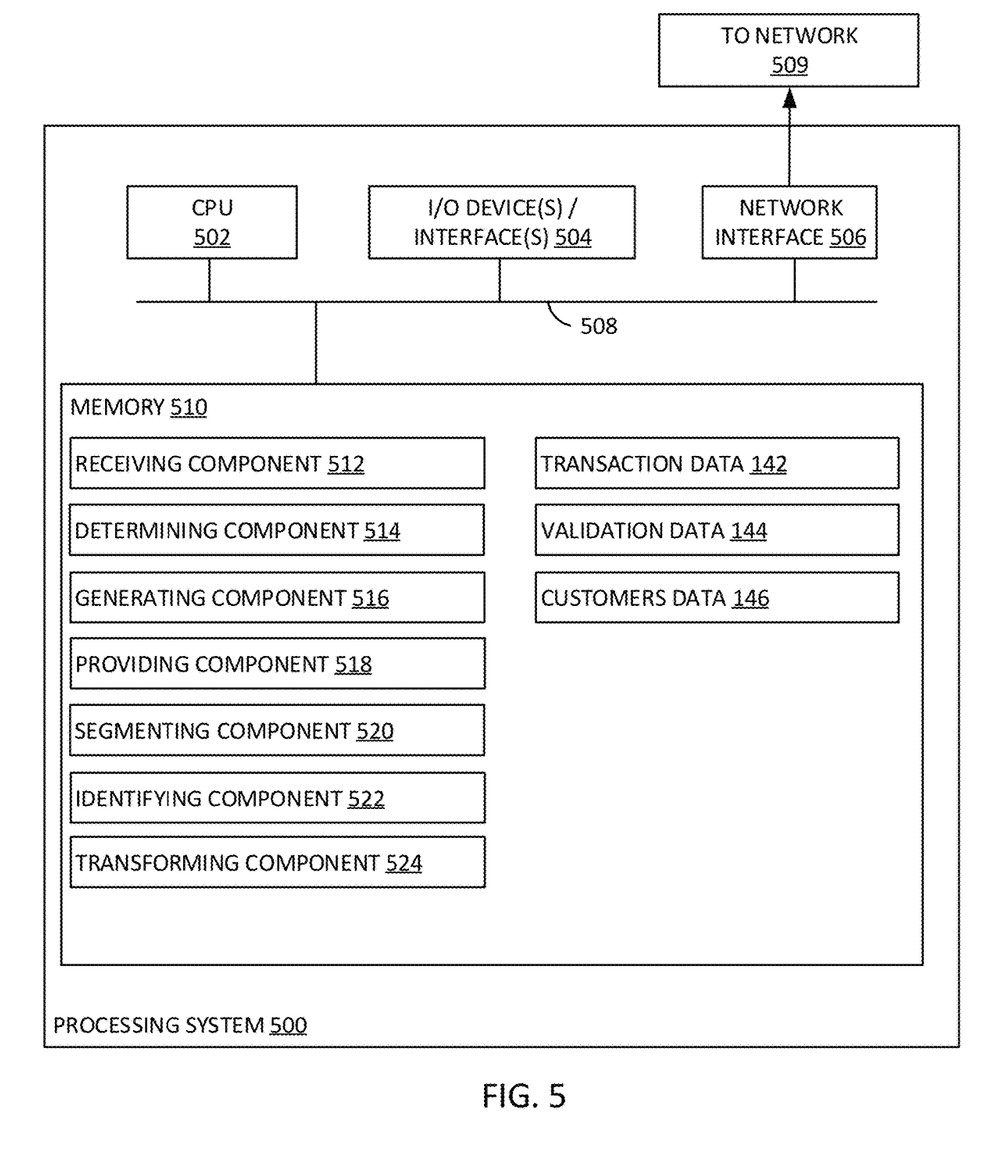
FIG. 5 depicts an example processing system configured to perform methods for transaction vectorization, in accordance with certain embodiments of the present disclosure.

FIG. 5 depicts an exemplary processing system 500 configured to perform methods for transaction vectorization.

Processing system 500 includes a CPU 502 connected to a data bus 508. CPU 502 is configured to process computer-executable instructions, e.g., stored in memory 510 or storage 530, and to cause processing system 500 to perform methods as described herein, for example with respect to FIGS. 2 and 4. CPU 502 is included to be representative of a single CPU, multiple CPUs, a single CPU having multiple processing cores, and other forms of processing architecture capable of executing computer-executable instructions.

Processing system 500 further includes input/output devices and interface 504, which allows processing system 500 to interface with input/output devices, such as, for example, keyboards, displays, mouse devices, pen input, touch sensitive input devices, cameras, microphones, and other devices that allow for interaction with processing system 500. Note that while not depicted with independent external I/O devices, processing system 500 may connect with external I/O devices through physical and wireless connections (e.g., an external display device).

Processing system 500 further includes network interface 506, which provides processing system 500 with access to external computing devices, such as via network 509.

Processing system 500 further includes memory 510, which in this example includes various components configured to perform the functions described herein. In this implementation, memory 510 includes receiving component 512, determining component 514, generating component 516, providing component 518, segmenting component 520, identifying component 522, and transforming component 524. These various components may, for example, comprise computer-executable instructions configured to perform the various functions described herein.

Memory 510 also includes transaction data 142 described above with respect to FIG. 1. Memory 510 also includes validation data 146 described above with respect to FIG. 1. Memory 510 also includes customers data 146 described above with respect to FIG. 1. While not depicted in FIG. 5, other aspects may be included in memory 510.

Note that while shown as a single memory 510 in FIG. 5 for simplicity, the various aspects stored in memory 510 may be stored in different physical memories, but all accessible CPU 502 via internal data connections, such as bus 512. For example, some components of memory 510 may be locally resident on processing system 500, while others may be performed on remote processing systems or in cloud-based processing systems in other embodiments. This is just one example.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
    receiving electronic transaction information of one or more transactions of a user, wherein the electronic transaction information is in a first format having a first syntax;
    for each transaction of the one or more transactions:
        segmenting, based on a segmenting criteria, the electronic transaction information of the transaction into one or more transaction words;
        generating, based on the one or more transaction words, a second transaction description related to the transaction; and
        identifying, based on the second transaction description, a category of the transaction;
    generating, based on the corresponding identified category of each transaction of the one or more transactions, a set of transaction history data of the user;
    providing the set of transaction history data of the user as an input to a machine learning model, wherein the machine learning model has been trained based on historical transaction data to output word embedding vectors based on input transaction history data;
    receiving, from the machine learning model based on the set of transaction history data, a set of word embedding vectors representing words in the set of transaction history data as sets of values corresponding to a plurality of dimensions, wherein higher values in the sets of values indicate keywords that are more dominant, and wherein the machine learning model is trained to assign higher values in the sets of values to respective words that are certain types of key words than to other words that are not the certain types of key words;
    generating one or more transaction vectors based on the set of word embedding vectors by calculating an absolute maximum of the set of word embedding vectors across each dimension of the plurality of dimensions;
    receiving additional electronic transaction data related to one or more merchants, wherein the additional electronic transaction data is in a second format different than the first format having a second syntax different than the first syntax; generating one or more merchant vectors based on the additional electronic transaction data, wherein the one or more merchant vectors comprise values corresponding to the plurality of dimensions;
    determining, based at least on the one or more transaction vectors and the one or more merchant vectors, a set of similar merchants; and
    providing one or more recommendations or discounts related to the set of similar merchants for display to the user.

2. The method of claim 1, further comprising: for each transaction of the one or more transactions, generating, based on the identified category of the transaction and the second transaction description of the transaction, one or more transaction sentence strings.

3. The method of claim 2, wherein each transaction sentence string comprises at least two or more second transaction descriptions concatenated by a delimiter.

4. The method of claim 3, wherein the set of transaction history data of the user comprises the one or more transaction sentence strings.

5. The method of claim 1, wherein each word embedding vector of the set of word embedding vectors corresponds to a transaction word in the set of transaction history data of the user.

6. The method of claim 1, further comprising: identifying, based on the one or more transaction vectors, a set of similar users.

7. The method of claim 6, further comprising:
    determining, based on the set of similar users, the set of similar merchants.

8. A processing system, comprising:
a memory comprising computer-executable instructions;
a processor configured to execute the computer-executable instructions and cause the processing system to:
  receive electronic transaction information of one or more transactions of a user, wherein the electronic transaction information is in a first format having a first syntax;
  for each transaction of the one or more transactions:
    segmenting, based on a segmenting criteria, the electronic transaction information of the transaction into one or more transaction words;
    generating, based on the one or more transaction words, a second transaction description related to the transaction; and
    identifying, based on the second transaction description, a category of the transaction;
  generate, based on the corresponding identified category of each transaction of the one or more transactions, a set of transaction history data of the user;
  provide the set of transaction history data of the user as an input to a machine learning model, wherein the machine learning model has been trained based on historical transaction data to output word embedding vectors based on input transaction history data;
  receive, from the machine learning model based on the set of transaction history data, a set of word embedding vectors representing words in the set of transaction history data as sets of values corresponding to a plurality of dimensions, wherein higher values in the sets of values indicate keywords that are more dominant, and wherein the machine learning model is trained to assign higher values in the sets of values to respective words that are certain types of key words than to other words that are not the certain types of key words;
  generate one or more transaction vectors based on the set of word embedding vectors by calculating an absolute maximum of the set of word embedding vectors across each dimension of the plurality of dimensions;
  receive additional electronic transaction data related to one or more merchants, wherein the additional electronic transaction data is in a second format different than the first format having a second syntax different than the first syntax; generate one or more merchant vectors based on the additional electronic transaction data, wherein the one or more merchant vectors comprise values corresponding to the plurality of dimensions;
  determine, based at least on the one or more transaction vectors and the one or more merchant vectors, a set of similar merchants; and
  provide one or more recommendations or discounts related to the set of similar merchants for display to the user.

9. The processing system of claim 8, wherein the processor is further configured to cause the processing system to:
for each transaction of the one or more transactions, generate, based on the identified category of the transaction and the second transaction description of the transaction, one or more transaction sentence strings.

10. The processing system of claim 9, wherein each transaction sentence string comprises at least two or more second transaction descriptions concatenated by a delimiter.

11. The processing system of claim 10, wherein the set of transaction history data of the user comprises the one or more transaction sentence strings.

12. The processing system of claim 8, wherein each word embedding vector of the set of word embedding vectors corresponds to a transaction word in the set of transaction history data of the user.

13. A non-transitory computer-readable medium comprising computer-executable instructions, which, when executed by a processing system, cause the processing system to:
  receive electronic transaction information of one or more transactions of a user, wherein the electronic transaction information is in a first format having a first syntax;
  for each transaction of the one or more transactions:
    segmenting, based on a segmenting criteria, the electronic transaction information of the transaction into one or more transaction words;
    generating, based on the one or more transaction words, a second transaction description related to the transaction; and
    identifying, based on the second transaction description, a category of the transaction;
  generate, based on the corresponding identified category of each transaction of the one or more transactions, a set of transaction history data of the user;
  provide the set of transaction history data of the user as an input to a machine learning model, wherein the machine learning model has been trained based on historical transaction data to output word embedding vectors based on input transaction history data;
  receive, from the machine learning model based on the set of transaction history data, a set of word embedding vectors representing words in the set of transaction history data as sets of values corresponding to a plurality of dimensions, wherein higher values in the sets of values indicate keywords that are more dominant, and wherein the machine learning model is trained to assign higher values in the sets of values to respective words that are certain types of key words than to other words that are not the certain types of key words;
  generate one or more transaction vectors based on the set of word embedding vectors by calculating an absolute maximum of the set of word embedding vectors across each dimension of the plurality of dimensions;
  receive additional electronic transaction data related to one or more merchants, wherein the additional electronic transaction data is in a second format different than the first format having a second syntax different than the first syntax; generate one or more merchant vectors based on the additional electronic transaction data, wherein the one or more merchant vectors comprise values corresponding to the plurality of dimensions;
  determine, based at least on the one or more transaction vectors and the one or more merchant vectors, a set of similar merchants; and
  provide one or more recommendations or discounts related to the set of similar merchants for display to the user.

14. The non-transitory computer-readable medium of claim 13, wherein the computer-executable instructions, when executed by the processing system, further cause the processing system to, for each transaction of the one or more transactions, generate, based on the identified category of the transaction and the second transaction description of the transaction, one or more transaction sentence strings.

15. The non-transitory computer-readable medium of claim 14, wherein each transaction sentence string comprises at least two or more second transaction descriptions concatenated by a delimiter.

16. The non-transitory computer-readable medium of claim 15, wherein the set of transaction history data of the user comprises the one or more transaction sentence strings.

17. The non-transitory computer-readable medium of claim 13, wherein each word embedding vector of the set of word embedding vectors corresponds to a transaction word in the set of transaction history data of the user.

18. The non-transitory computer-readable medium of claim 13, wherein the computer-executable instructions, when executed by the processing system, further cause the processing system to identify, based on the one or more transaction vectors, a set of similar users.

19. The non-transitory computer-readable medium of claim 18, wherein the computer-executable instructions, when executed by the processing system, further cause the processing system to determine, based on the set of similar users, the set of similar merchants.

20. The processing system of claim 8, wherein the processor is further configured to cause the processing system to identify, based on the one or more transaction vectors, a set of similar users.

21. The processing system of claim 20, wherein the processor is further configured to cause the processing system to determine, based on the set of similar users, the set of similar merchants.

* * * * *